L. RASCH.
MOTOR FOR GAS METERS.
APPLICATION FILED DEC. 26, 1916. RENEWED OCT. 19, 1918.

1,355,165.
Patented Oct. 12, 1920.

WITNESS:
René Spruine

INVENTOR:
Louis Rasch
By Attorneys,
Fraser, Turk & Myers

UNITED STATES PATENT OFFICE.

LOUIS RASCH, OF NEW YORK, N. Y., ASSIGNOR OF ONE-FOURTH TO JOSEPH REBHOLZ AND ONE-TENTH TO FRED J. SCHILL, BOTH OF BAYSHORE, NEW YORK, AND ONE-FOURTH TO A. SCHRADER'S SON, INCORPORATED, OF BROOKLYN, NEW YORK, A CORPORATION OF NEW YORK.

MOTOR FOR GAS-METERS.

1,355,165.  Specification of Letters Patent.  Patented Oct. 12, 1920.

Application filed December 26, 1916, Serial No. 138,709. Renewed October 19, 1918. Serial No. 258,910.

*To all whom it may concern:*

Be it known that I, LOUIS RASCH, a subject of the Emperor of Germany, (having declared his intention of becoming a citizen of the United States of America,) residing in the borough of Manhattan, city, county, and State of New York, have invented certain new and useful Improvements in Motors for Gas-Meters, of which the following is a specification.

This invention relates particularly to that form of gas meter in which a rotary fan or impact-wheel operates the indicating registering or recording mechanism. It is peculiarly adapted for operating the means for indicating either the value or the quantity of gas consumed. Another object of the invention is to provide a meter of small size which is capable of indicating the passage of a very small amount of gas as well as being able to also accurately record the passage of a larger amount of gas.

According to this invention the gas driven wheel or fan is so disposed in the gas passage that the power of the gas in blowing past the fan is utilized practically to its full extent in causing a rotary motion of the fan. For this purpose the line of passage of the gas is preferably tangential to the periphery of the fan wheel. It is also desirable to have the cross section of the gas passage substantially conterminous with the area of the vanes of the wheel.

In the drawings accompanying this application I have illustrated my invention, in which drawings,—

Figure 1:
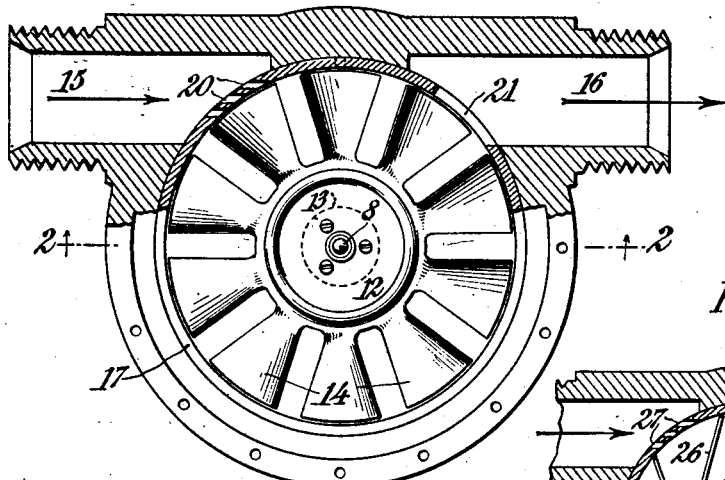
Figure 1 is an elevational view partly in vertical longitudinal section of a practicable embodiment of the invention; this view is drawn on an enlarged scale from a commercial form of the meter.

Referring particularly to the form of meter illustrated in the drawings, the reference character 7 indicates the casing of the meter which is preferably a casting. On one end of this casing the indicating or registering mechanism is preferably mounted. The details of such mechanism forming no part of the present invention, these portions are shown in dotted lines, with the exception, however, of the driving connections between the registering mechanism and the spindle of the fan wheel. The spindle 8 is shown carrying the fan wheel and also provided with a worm 9 meshing with a worm wheel 10 associated with the train of the registering mechanism. The spindle is shown mounted in a horizontal position and supported on jewel bearings 11. There is shown fast on this spindle a fan wheel which in the present illustration is formed of sheet metal and has a central disk portion 12 secured in some suitable manner, as for instance by means of screws, to a hub 13 formed on the spindle 8. The blades or vanes 14 are shown formed integrally with the central disk 12 and bent into position obliquely to their axis of rotation and to the plane of the central disk 12. In the form of fan illustrated in Figs. 1 and 2 the faces of the blades are shown disposed radially of the wheel, that is the central line of each blade will coincide with the radius of the disk 12.

The gas inlet passage is shown at 15 and the gas outlet passage at 16. The present illustration shows the passages of the inlet and the outlet substantially in alinement and disposed horizontally and located above the horizontal axis of the impact wheel or fan. The wheel is shown located in a chamber in communication with both of these passages, the walls of such chamber being so formed that they closely conform to the contour of the blades. In the present illustration the peripheral wall 17 of such chamber is provided in the form of a ring fitting into the casing 7; such ring is shown formed integrally with a plate 18 which affords the wall of the chamber at one side of the fan, the wall of the chamber at the other side of the fan being provided by a plate 19 which serves as a closure. This plate is shown held to the casing by means of suitable fastening devices, and a packing is provided to insure a close joint.

Figure 2:
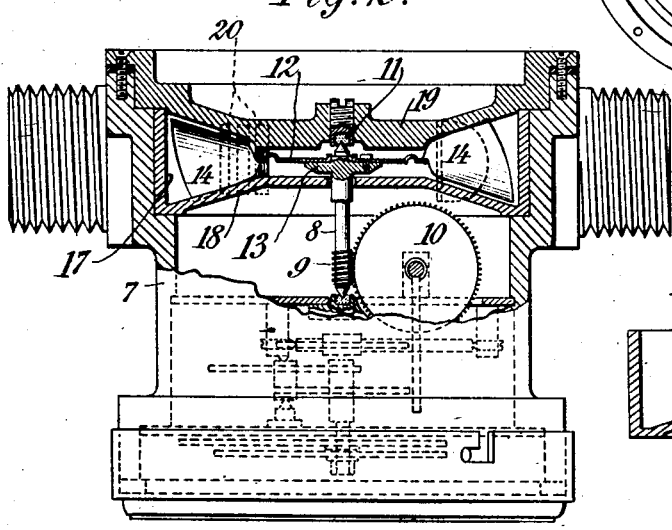
Fig. 2 is a plan partly in elevation and partly in horizontal section of the meter shown in Fig. 1; the plane on which the sectional parts are taken being indicated by the line 2—2 in Fig. 1, looking upwardly or in the direction of the arrows at such line.
Figure 3:
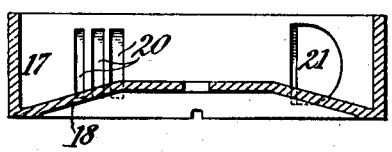
Fig. 3 is a detail of a part of the fan casing removed.

In the operation of a meter of this character, it is quite desirable that the in-flowing gas shall at all times be capable of acting instantaneously upon the most adjacent blade surface and force this blade in the proper direction. The gas inlet to the chamber may with advantage be disposed for coöperation with the obliquely disposed blades. The ring 17 serves as a convenient means of forming ports or passageways to the fan wheel chamber in a manner to properly act upon the vanes or blades of this wheel. In Fig. 1 the inlet port is shown formed of three separate openings indicated by the reference character 20. Each of these openings in the present illustration is disposed parallel with the general direction of gas flow. These openings have some suitable form, preferably being in the form of slots extending across the ring parallel with the axis of rotation, see Fig. 3. It will be seen that some portion of a blade surface is always in position to be acted upon by a portion at least of the in-flowing gas and that it will be impossible for a blade to become so located in relation to the inlet port that the fan wheel will be held stationary or given a retrograde movement. These difficulties are frequently encountered in connection with meters in which a small flow of gas is to be registered and in which the flow is intermittent.

The outlet port 21 through the ring 17 is shown in the form of a single opening of larger area than the combined areas of the openings 20.

Figure 5:
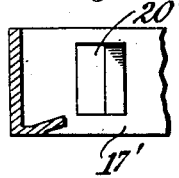
Fig. 5 is a detail of a broken away portion of a modified form of fan casing.

In some instances it has been found desirable to increase the inlet port, but, nevertheless, keep it of smaller area than the inlet 15. In this case some suitable form of opening is provided, having due regard for the form of the blades, a single opening 20′ being illustrated in the ring 17′ in Fig. 5.

Figure 4:
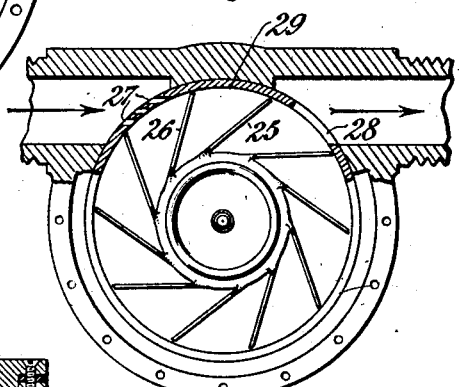
Fig. 4 is a view similar to Fig. 1 on a reduced scale, however, showing a different form of fan construction.

It is quite desirable in meters of this character that the tendency of the gas is not only in a straight line tangentially of the wheel, but that the blades should not interfere with this tendency of gas movement, as is the case in some constructions of meter, and cause the gas, or portions of it, to move toward the center of the wheel, a centrifugal action of the gas being preferable. In the construction of fan shown in Fig. 4 this is accomplished by providing the fan with a series of tangentially disposed blades 25, the gas receiving face 26 of each of these blades being disposed in such position relative to the flow of gas through the ports 27 that the line of gas movement is never at an angle greater than 90° with such face, such angle becoming more acute as the blade moves toward the outlet port 28. This assures a positive fan movement without any danger of stoppage or back movement; it also assures that eddy currents be not formed at the center of the wheel and that those portions of the gas having a tendency to leave the straight line of gas movement are thrown toward the periphery of the wheel and traverse the arch 29 and readily find exit at the outlet port 28.

It is to be understood that the mechanisms shown in the accompanying drawings are illustrative of my invention and that changes may be made as occasion demands within the scope of the claims without departing from the spirit of the invention.

It is an important feature of my invention, and one to which its success as a practical gas meter is largely attributable, that the fan wheel or metering element is so related to its chamber and to the gas inlet and outlet passages, that however small or large be the flow of gas, practically no gas passing through the meter can escape past the wheel without impressing upon the latter a rate of movement proportional to the volume of flow; to which end it is essential that the chamber shall closely embrace and conform to the fan wheel, so that none of the gas passing through the meter can slip past the wheel without having its due effect upon the rotation of the wheel. It is also practically important that the entering gas impinging upon the blades shall not thereby be directed toward the center of the wheel, but that the flow of gas with respect to the wheel be maintained as nearly tangential as possible.

In so far as the structure set forth in my present application contains, or is identical with, that set forth in my British Patent No. 21,375, dated 22 September, 1913, the present application is a continuation of my application for United States Patent filed September 21, 1914, Serial No. 862,858, which application was based upon the application for said British patent.

What I claim is:—

1. In a gas meter, a casing forming a circular chamber having an annular portion and tangential inlet and outlet openings communicating therewith, and an impact wheel mounted to turn in said chamber, comprising a central disk and symmetrical blades projecting therefrom, said blades being widest at their outer sides and becoming thence narrower toward their junction with the disk, the wheel being of minimum inertia and mounted delicately on a substantially frictionless pivotal mounting wholly within said casing, and the annular chamber inclosing said wheel and conforming thereto so that the blades move therein with slight clearance, said inlet and outlet openings directing a flow of gas tangentially through said chamber, and said blades receiving the impact of such flow to turn the wheel, whereby the wheel is adapted to vary its rate of rotation in direct relation to variations in flow.

2. In a gas meter, a casing forming a circular chamber having an annular portion and tangential inlet and outlet openings communicating therewith, and an impact wheel mounted to turn in said chamber, comprising a central disk and symmetrical blades projecting therefrom, said blades of an outline approximately conforming to said annular chamber and movable therein with slight clearance, the casing comprising a main casing, a lining casing therein, and a removable head, said lining casing and head being relatively conformed to constitute the circular chamber with its annular portion.

3. In a gas meter, a casing forming a circular chamber having an annular portion and tangential inlet and outlet openings communicating therewith, and an impact wheel mounted to turn in said chamber, comprising a central disk and symmetrical blades projecting therefrom, said blades of an outline approximately conforming to said annular chamber and movable therein with slight clearance, the casing comprising a main casing, a lining casing therein, comprising a disk portion and a cylindrically-flanged portion, the outer casing having an enlargement in which such cylindrically-flanged portion fits, and a removable head, said lining casing and head being relatively conformed to constitute the circular chamber with its annular portion, and said inlet and outlet openings formed through said flanged portion.

4. In a gas meter, a revolving impact wheel and a casing formed with a chamber closely inclosing and conforming to such wheel, the periphery of such chamber being formed of a partition plate distinct from the casing, the meter having gas inlet and outlet openings formed through such partition plate and located to cause a flow of gas through such chamber tangentially to the path of the blades of said wheel.

5. In a gas meter according to claim 4, the gas inlet subdivided into a plurality of openings formed through such partition plate, adapted to direct successive streams of gas tangentially against the blades of said wheel.

In witness whereof I have hereunto signed my name in the presence of a subscribing witness.

LOUIS RASCH.

Witness:
CHAS. LYON RUSSELL.